(12) United States Patent
Vertes et al.

(10) Patent No.: US 9,164,812 B2
(45) Date of Patent: Oct. 20, 2015

(54) METHOD AND SYSTEM TO MANAGE MEMORY ACCESSES FROM MULTITHREAD PROGRAMS ON MULTIPROCESSOR SYSTEMS

(75) Inventors: Marc Vertes, Saint Lys (FR); Philippe Bergheaud, Colmar (FR); Dinesh Kumar Subhraveti, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 12/485,394

(22) Filed: Jun. 16, 2009

(65) Prior Publication Data
US 2009/0254724 A1    Oct. 8, 2009

(51) Int. Cl.
| G06F 12/00 | (2006.01) |
| G06F 13/00 | (2006.01) |
| G06F 13/28 | (2006.01) |
| G06F 9/52  | (2006.01) |
| G06F 11/20 | (2006.01) |

(52) U.S. Cl.
CPC ............ *G06F 9/526* (2013.01); *G06F 11/2097* (2013.01)

(58) Field of Classification Search
CPC .......................... G06F 11/2097; G06F 9/526
USPC ................... 711/162, 163, 170, 206
See application file for complete search history.

(56) References Cited

U.S. PATENT DOCUMENTS

| 5,611,043 A * | 3/1997 | Even et al. ............... 714/38.13 |
| 5,890,189 A * | 3/1999 | Nozue et al. ............... 711/100 |
| 6,029,224 A * | 2/2000 | Asthana et al. ............... 711/5 |
| 6,085,296 A * | 7/2000 | Karkhanis et al. ........... 711/147 |
| 6,854,108 B1  | 2/2005 | Choi |
| 2002/0013892 A1 * | 1/2002 | Gorishek et al. ........... 712/227 |
| 2003/0084375 A1 * | 5/2003 | Moore et al. ............... 714/34 |
| 2003/0200398 A1 * | 10/2003 | Harris ............... 711/152 |
| 2006/0200863 A1 * | 9/2006 | Ray et al. ............... 726/24 |
| 2007/0214340 A1 * | 9/2007 | Leveille et al. ........... 711/203 |

FOREIGN PATENT DOCUMENTS

| EP | 0381325     | 8/1990 |
| WO | WO2006077261 | 7/2006 |

(Continued)

OTHER PUBLICATIONS

Russinovich, M., et al.; "Replay for Concurrent Non-Deterministic Shared-Memory Applications"; ACM Sigplan Notices, ACM, Association for Computing Machinery, New York, NY, US; vol. 31, No. 5; May 1, 1996; pp. 258-266.

Ronsse, M., et al.; "Debugging Shared Memory Parallel Programs Using Record/Replay"; Future Generations Computer Systems, Elsevier Science Publishers, Amsterdam, NL; vol. 19, No. 5; Jul. 2003; pp. 679-687.

(Continued)

*Primary Examiner* — Sheng-Jen Tsai
(74) *Attorney, Agent, or Firm* — Suiter Swantz pc llo

(57) ABSTRACT

A method, computer program and system for controlling accesses to memory by threads created by a process executing on a multiprocessor computer. A page table structure is allocated for each new thread and copied from the existing threads. The page access is controlled by a present bit and a writable bit. Upon a page fault the access is provided to one thread. The kernel handles the new page entry creation process and set the page present bits to zero which creates page faults. In a second embodiment, two page table structures are created, one for one thread having access to the address space and the other page table structure shared by all the other threads not having access to the address space.

11 Claims, 5 Drawing Sheets

(56) References Cited

FOREIGN PATENT DOCUMENTS

| WO | 2006127613 A2 | 11/2006 |
| WO | WO2006/127613 A2 | 11/2006 |

OTHER PUBLICATIONS

Choi, J-D, et al.; "Deterministic Replay of Java Multithreaded Applications", Proceedings of the Sigmetrics Symposium on Parallel and Distributed Tools, SPDT '98, Welches, OR, Aug. 3-4, 1998, Sigmetrics Symposium on Parallel and Distributed Tools, New York, NY; ACM, US; vol. Symp. 2; Aug. 3, 1998; pp. 48-59.

Bergheaud, Philippe; Subhraveti, Dinesh; Vertes, Marc: "Fault Tolerance in Multiprocessor Systems Via Application Cloning"; Distributed Computing Systems, Jun. 25, 2007; retrieved from the internet: URL:http://ieeexplore.ieee.org on Sep. 6, 2007.

* cited by examiner

METHOD AND SYSTEM TO MANAGE MEMORY ACCESSES FROM MULTITHREAD PROGRAMS ON MULTIPROCESSOR SYSTEMS

CROSS-REFERENCE TO RELATED APPLICATIONS

The present application claims the benefit under 35 U.S.C. §119 of EPO Application Serial Number 06301287.6, filed Dec. 21, 2006 entitled "A METHOD AND SYSTEM TO MANAGE MEMORY ACCESSES FROM MULTI-THREAD PROGRAMS ON MULTIPROCESSOR SYSTEMS" which is incorporated herein by reference.

FIELD OF THE INVENTION

The present invention generally relates to shared memory access between multithread application programs executing on a multiprocessor system; more particularly, the present invention deals with making the shared memory accesses deterministic events, for instance, to facilitate replication of a multithread application which is virtualized.

BACKGROUND OF THE INVENTION

The secure and naive way to virtualize shared memory accesses between threads is to log every access to the memory and replay them in the replication machine. This is particularly inefficient in terms of performance.

There is a need for making the shared memory accesses of multithread programs deterministic in order, for instance, to be able to replicate on a backup machine the application virtualized on a primary machine, by simply re-executing the code of the application programs on the replication machine. A main use could be in fault tolerant systems. In a fault tolerant system, an application runs on a primary machine and its execution is entirely replicated on a second machine (in order to recover, in case of primary failure). The replication is achieved by recording and replay of events that produce non deterministic results or reexecution of code for replicating events producing deterministic results. One other use of making shared memory access by multithread programs deterministic is debugging of the virtualized programs which is performed by re-executing the code (on the same machine in this case) as many times as necessary.

Interleaved execution of processes with respect to a writable shared memory region is a potential source of non-determinism. In order to be able to make the shared memory accesses deterministic, the order in which the shared memory is accessed by concurrent processes needs to be recorded. In the case of a uniprocessor machine, the recording operation can be optimized by just logging one record per scheduling period. Instead of logging every access to the shared memory region, it is sufficient to log one record per scheduling period in which the shared memory region was accessed, if the record specifies the process identifier along with the location of the first instruction at which the access was made in that scheduling period and the number of user instructions executed by the process until the end of that scheduling period. Consequently, for a scheduling period the shared memory accesses have become deterministic events. To reproduce this event in a backup machine it is sufficient to restore the record of the scheduling period and to reexecute the code for this period.

To extend this optimization to multi-processor machines, the uniprocessor property of mutual exclusion needs to be imposed to serialize accesses to the shared memory regions. The French patent application WO2006/077261 assigned to Internal Business Machines Corporation describes how to implement deterministic replay of multi-process applications on multiprocessor systems. A shared memory access control mechanism is described wherein; it uses the Memory Management Unit of the processor (MMU). Control to access to the shared memory is done by programming the MMU (Memory Management Unit) hardware device of one processor to allow granting access to a memory page, the MMU of other processors being programmed to deny any access to the same page.

In a scheduling period, on multi-processor machines, an exclusive access to the shared memory is given to each individual process. The page tables of the processes are instrumented to selectively grant access to a single process in each scheduling period. However, in case of multi-thread programs, the participating processes share their address space; applying the mono processor solution by instrumenting the shared page table would affect the entire thread group. Further, in contrast to processes in a mono-processor environment, entire address space would be shared among the threads and for monitoring and controlling these accesses, any access to writable portions of the shared address space has to be tracked. This implies that each task can have its own private set of memory descriptors even if the memory pages are shared. This is not the case for multi thread programs where all the memory descriptors are shared. This patent application suggests that for tracking shared memory accesses by one task creating more than one thread, the structure of the page table entries need to be extended to each thread cloned within each task which is monitored as described in the invention. The principle of the invention can be applied to each task or each thread within one task, the accesses to shared memory pages being exclusive over an entire duration of an activation period denied by the scheduler. During this period the shared memory pages are maintained coherent.

There is thus a need for extending the virtual memory manager module of the kernel to make the mechanism of shared memory accesses serialization of the prior art applicable to multi-thread programs which all share their entire memory space (rather than processes sharing only a subset of their memory space).

U.S. Pat. No. 6,854,108 describes a method for deterministically replaying an observable run time behavior of distributed multithreaded programs on multi processors. This method relies on instrumentation of locking routines in a JVM. This solution implies modification of the JVM and is limited to pure Java applications running on top of the JVM and is limited by the fact that all the memory accesses have to be protected by lock to be done by the JVM.

There is a need to provide a shared memory access control applying to multithreaded processes on multi-processor computers which is generic and transparently applicable to any type of applications.

SUMMARY OF THE INVENTION

It is therefore an object of the present invention to make shared memory access by multi-thread programs monitorable and controllable in order to serialize these accesses and turn them into deterministic events.

It is another object of the present invention to provide a method implemented transparently to the application.

It is one other object of the invention to use the existing method for managing access to shared resources in a multiprocessor environment which provides exclusive accesses to any task or thread in a more efficient way.

These objects are achieved, as claimed in claim 1, by a method for controlling accesses to memory by threads created by a process executing on a multiprocessor computer, said method comprising: the process requesting creation of a new thread; allocating a new page table directory in the memory descriptor and creating a copy of the page table of the existing thread; waiting for an event; when a page fault occurs, the two bits indicating that the page is present in memory and writable are tested; if the page is present and writable, and if the thread is tested that it is about to exit, granting to the thread having caused the page fault an access to the page and setting the bit indicating that the page is present in memory and writable, and going to the step waiting for an event; if the page is present and writable, if an other thread has access to it and waiting for release of the page by the other thread wait for the other thread to release; and when the thread has released access, granting to the thread having caused the page fault an access to the page and setting the bit indicating that the page is present in memory and writable, and going to the step waiting for an event.

The objects are also achieved, according to claim 2, by the method of claim 1 further comprising: after the step of testing the two bits indicating that the page is present in memory and writable, if the page is not present or not writable, letting the kernel handling the page fault; testing if the new page after its creation by the kernel process is writable by testing the corresponding bit, if the new page is writable, resetting the present bit of the new page; propagating the page table entry created by the kernel to the other page tables of all the threads; and going to the step waiting for an event.

These objects are also achieved with the methods of claims 3 to 4 for the solution of the preferred embodiment and the methods of claims 5 to 7 for the two page table structure of the second embodiment.

These objects are also achieved by the computer program and the system according to claims 8 and 9.

The solution of the invention allows managing separate memory descriptors referencing shared memory pages for each multithread application executing on a multiprocessor system.

Besides reaching the main object of the invention by making shared memory access by multi-thread programs monitorable and controllable, the other advantages are as follows:

Performance: the shared memory access control may improve the application performance when the granularity changes (time: from instruction duration to scheduling period duration, space: from word of 4 bytes to page of 4 Kbytes) because it reduces the contention rate on shared objects.

The solution as described according the third object of the invention is efficient enough to optimize the use of existing hardware functions in the processors. As mentioned in the detailed description of the preferred embodiment, the solution of the invention limits heavy modifications of existing computers by avoiding not only hardware modifications in the processor but also some heavy software changes in the kernel of the operating system.

Non virtualized tasks are not impacted by the modification. The original Memory Management system is preserved for non virtualized tasks. Other solutions may globalize the modifications for all the tasks which may have unpredictable consequences. This solution can be selectively implemented. For instance, additional use of memory can be unacceptable for all the tasks. Also, some task may not support the change of granularity: natural access control (warranted by hardware) is for one instruction and the size of one memory word in memory even if there is no capacity of observing or controlling it. One example of unfavorable effect is the Ping-Pong effect where two tasks alternatingly access a shared page: the solution of the invention hinders the performance of this case because the exclusive memory word is allocated with a time slice, the next task having to wait for thousands of instructions. There exists one solution to this: modify the application to allow explicit release of the page by a specific instruction.

DETAILED DESCRIPTION OF THE PREFERRED EMBODIMENT

Figure 1:
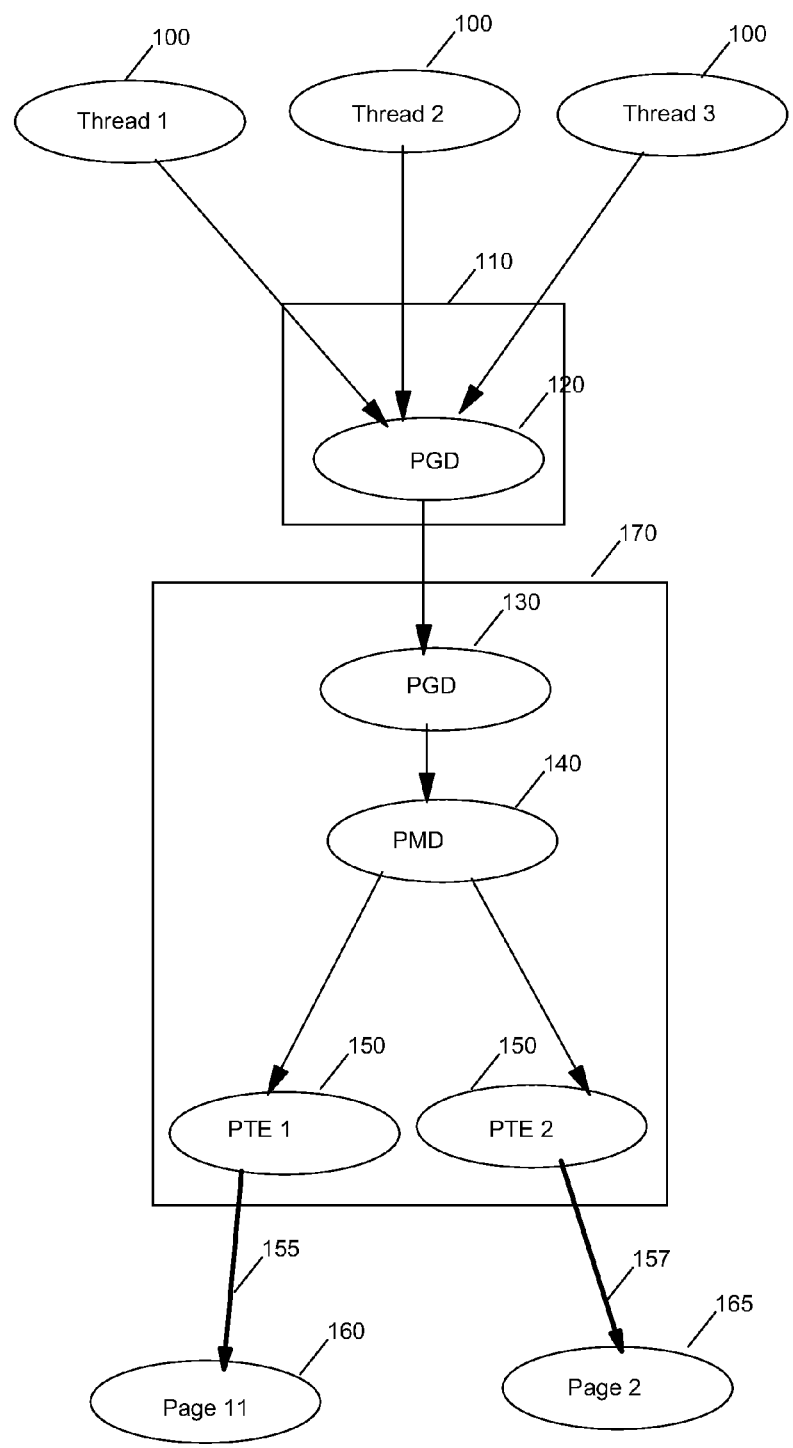
FIG. 1 illustrates the structure of the memory descriptors in a multithread application when the present invention is not implemented.

In a non-multithreaded application, to efficiently replay the order of shared memory accesses, exclusive access to the shared memory is given to individual processes in a scheduling period. The page tables of the processes are instrumented to selectively grant access to a single process in each scheduling period. However, in case of multi-thread programs, the participating processes share their address space, instrumenting the shared page table would affect the entire thread group. Further, in contrast to processes in a non-multithreaded application, entire address space would be shared among the threads and for monitoring and controlling these accesses, any access to writable portions of the shared address space has to be tracked. Then, used for replicating the multi-thread programs accesses to shared address space in fault tolerant systems, the access information is logged and will be used to replay the accesses by re-executing the program code in the backup machine.

To track the order in which the processes access the shared memory region, various design choices emerge by varying the granularity at which the accesses are tracked in space and time. Granularity in space can vary from an individual memory location, to a page, to the entire address space, while the granularity in time can vary from a single instruction accessing the shared region to the entire scheduling period. By tracking the accesses to individual memory locations at instruction level granularity, the execution of the application on the primary can be accurately reproduced. However, doing so is neither desirable nor feasible.

A conventional implementation of kernel threads provides a single page table for an entire thread group. In order to track the order of memory accesses, the following technique may be employed. The shared page table is modified to deny access to all the writable portions of address space. Doing so would force any thread attempting to access the region to cause a page fault. In the page fault handler, the access is logged and the current instruction is re-executed with the access to the memory location temporarily enabled. This ensures that every access to the shared memory by every thread is logged. However, this approach also imposes high overhead due to interception of every memory access.

To improve the efficiency the previous approach, the granularity may be changed from that of instruction level to that of a scheduling period. This requires mutual exclusion of access during a scheduling period, and by maintaining a synchronized set of page tables, one for each thread in the thread group, it is possible to selectively give access to individual processes for an entire scheduling period. When a thread is scheduled to run, the corresponding page table is loaded into the MMU context.

The set of page tables used for each thread group have to be completely synchronized. There can only be a difference in present flag between corresponding entries across two page tables in the set. Whenever an entry of any of the page tables is modified, the change has to be propagated to the rest of the page tables. Many kernel subsystems (like aio, swap etc) modify the page tables and in each instance, the modification has to be propagated to every page table in the group.

Granularity of memory is another dimension to consider. Byte (or processor word) level granularity would provide optimal degree of serialization needed for tracking the order of shared memory accesses. If the unit of memory is a page, for instance, contending processes would be denied access to the entire page as opposed to just the location of contention. This would especially be a problem when locks to many resources are placed in the same page. Serializing access to that page would serialize access to the entire set of resources. While word level granularity is desirable, it depends on the unit of memory used by the underlying architecture. Typical MMU architectures manage memory at page level granularity for optimal page table size.

On the other extreme, if the address space level granularity is used, the number of page tables required to provide exclusive access during a scheduling period can be compressed to two, regardless of the number of threads in the thread group. To provide exclusive access to the writable address space for one thread, corresponding entries in the page table of that thread would be marked present while the writable entries in the rest of the page tables would be marked absent. Since the page tables of threads that have been denied access to the address space are identical, a single page table (referred to as anti page table) can be used. In fact, the actual entries of anti page tables are irrelevant since they are never used in page translation. Anti page tables are only used to force a fault when a memory access is made from the context of a thread that is denied access. When a thread should be denied access to the address space, its page table is switched to anti page table, and vice versa.

The following describes the implementation of shared memory exclusive access mechanism for threads in the context of Linux kernel, and Linux paging model. Although the description uses Linux specific terminology, the method is sufficiently general to be applicable to other operating systems and architectures.

In order to provide exclusive access to shared memory, applying the invention of the prior art patent application, the implementation should provide the ability to seamlessly grant access to a single process and cause a fault when any of the other threads attempts to access the region. The paging mechanism available in most modern architectures is leveraged for this purpose. The "page_present" bit, which indicates whether a particular page is allocated in physical memory, is also artificially reset to trigger a page fault when the exclusive access to the page is assigned to another process. Doing so could potentially interfere with the regular paging mechanism. This is avoided by acquiring a lock on the page by incrementing its usage counter so that the kernel swapper would never swap the page.

FIG. 1 illustrates the structure of the memory descriptors in a multithread application when the present invention is not implemented. It illustrates the schematic of how page tables are shared by conventional threads. In FIG. 1 is illustrated one example of page table hierarchy as it can be found in most of operating systems including virtual memory management. A memory descriptor (110) is accessed by all the threads (100) of a process which need to access memory. The memory descriptor is the highest level of the page table hierarchy. It comprises of a pointer (120) to the Page Global Directory, PGD, (130) which is the tree root. The PGD points to a Page Middle Directory (PMD) (140) which indexes a list of page entries (150), that are pointers to the page frames (160, 165) in the physical memory. The PGD, PMD and PTEs form the page table structure (170) allowing the threads to access the pages of their common address space. The same page frames (160 and 165) are accessed (155, 157) by the three threads (100) through the page table structure (170) as described.

Figure 2:
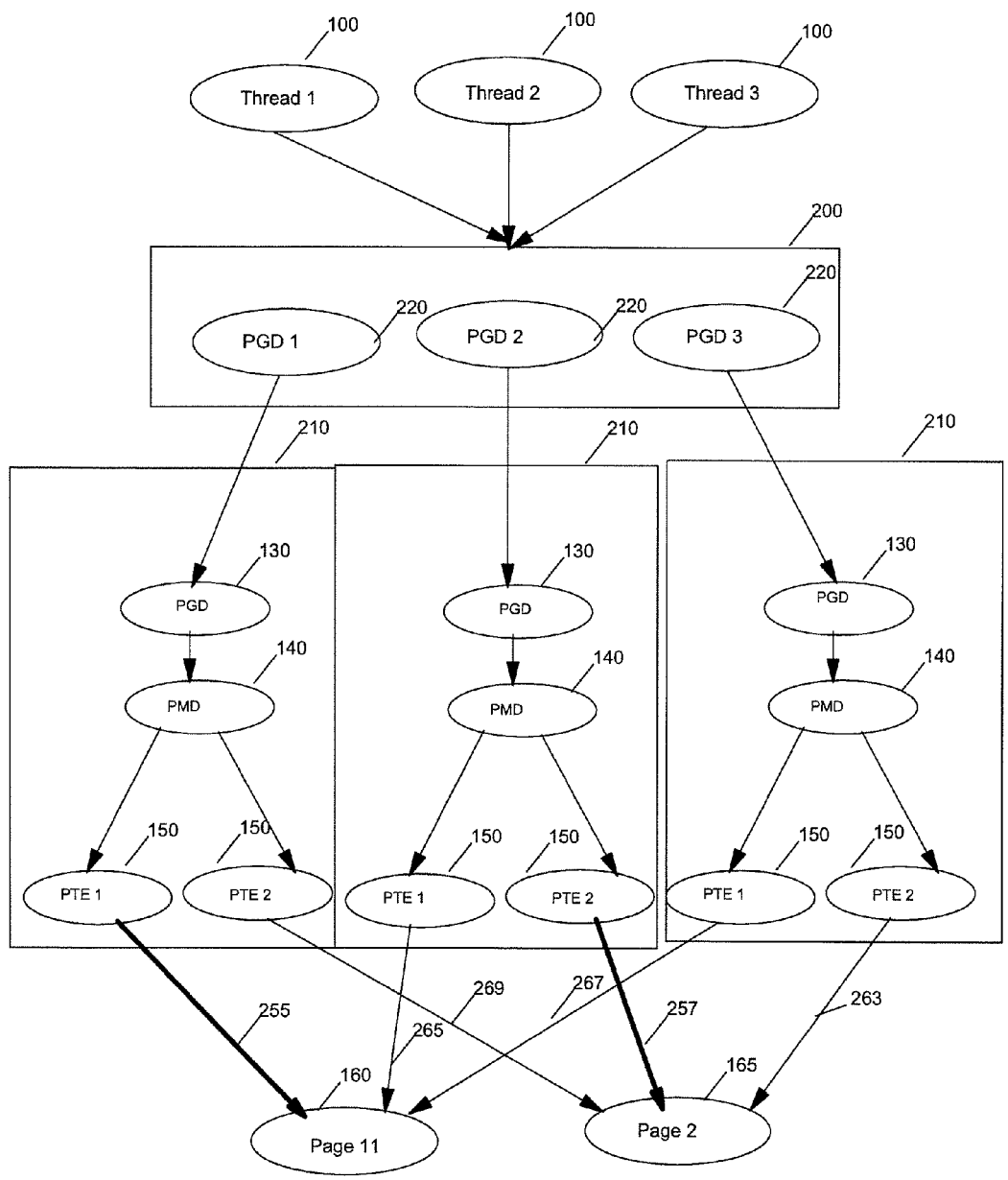
FIG. 2 illustrates the structure of the memory descriptors one table per task according to the preferred embodiment of the invention.

FIG. 2 illustrates the structure of the memory descriptors, one table per task, according to the preferred embodiment of the invention.

In a first approach consisting in applying the invention of the prior art patent application, it is sufficient to replicate the PTEs for each thread so that an exclusive access is guaranteed for each single thread. This is done by selectively turning on the present flag in the corresponding page table for a given page table entry. But since the address translation is hardwired into the MMU of the CPU, the entire page table hierarchy needs to be replicated. In fact, the segregation can be done at an even higher level of the memory descriptor (200), which includes the page table hierarchy and other parameters related to process address space. Each thread, in this approach, would be provided with a separate memory descriptor. It would be possible to leverage implementation of fork system call which creates a new process with Linux and replicates the page tables. Using fork would imply implementing a difficult synchronization. Memory descriptor is a widely used architecture independent data structure and changing its semantics for threads would require extensive kernel modifications. Furthermore, a centralized lock would be needed to synchronize the page tables across different memory descriptors in a thread group, which further complicates the implementation.

As shown in FIG. 2, in the preferred embodiment, each thread in a group is assigned a private page table (210). A hash table of these private page tables, indexed by the thread id, is maintained in the memory descriptor (200) shared by the thread group. Further, a pointer (220) to the page directory is placed in the process descriptor of corresponding thread so that the page directory can be quickly accessed during context switching operation. The hash table is used to obtain the page directory of a specific thread when only the memory descriptor of the process is available when operating in the virtual memory management subsystem of the kernel. Once each thread has its private page table (210), access to writable portions of memory is controlled exactly the same way as it is done in the case of shared memory access control for regular processes according to the solution of the patent application of the prior art. In the case of threads, every page in the address space is shared while in the case of processes, shared pages are specifically marked so. Using the process as described in relation with FIG. 5, some accesses of the memory are granted (255, 257) to two threads (Thread 1 and Thread 2) and some other accesses (263, 265, 267, 269) are denied to all the threads.

Once each thread has its private page table (210), access to writable portions of memory is selectively granted to one of the threads in the group by setting the page_present bit in the PTE of the accessed page for the grantee thread, while resetting the bit for all other threads, so that they would generate a page fault when they attempt to access the page.

Figure 3:
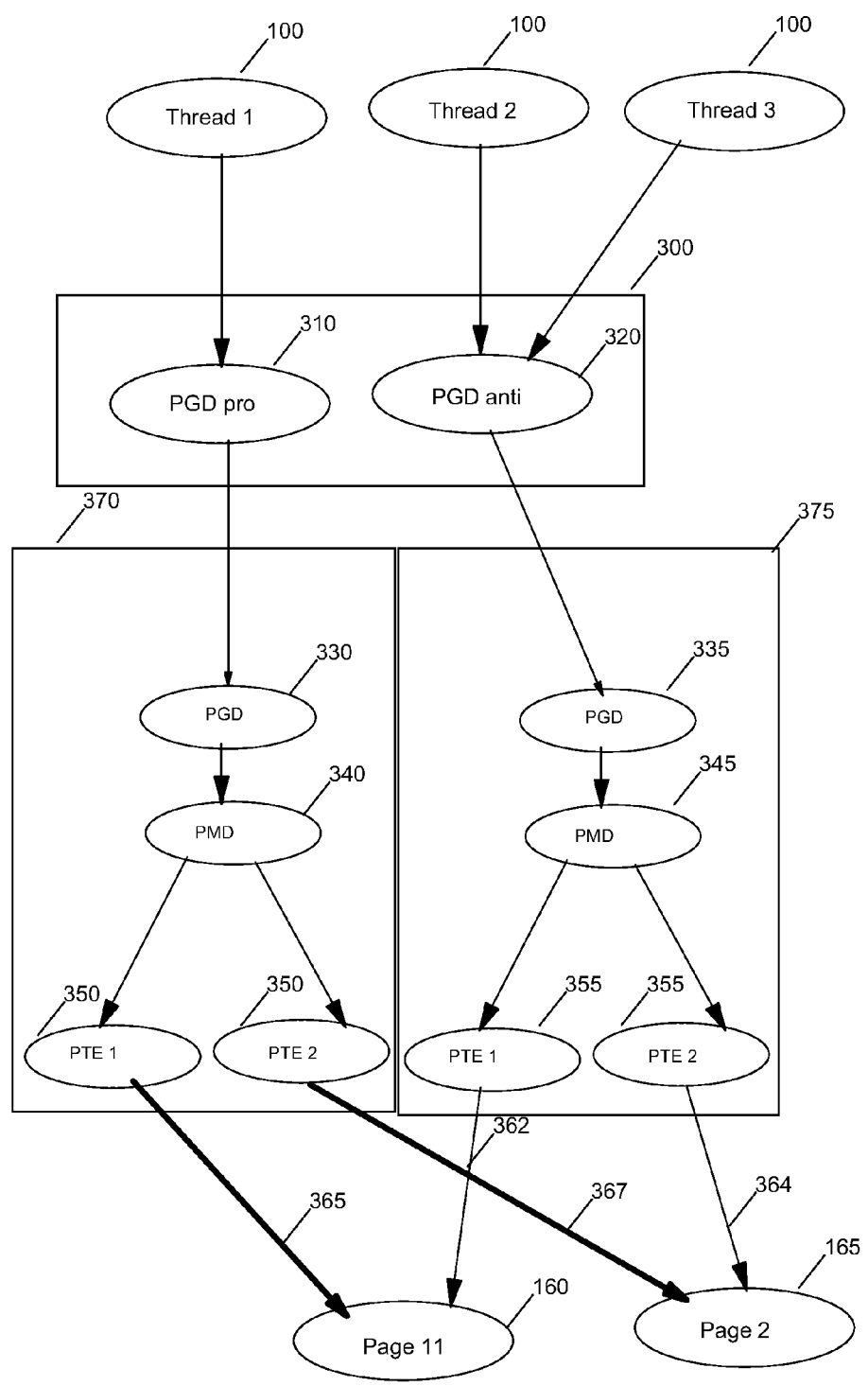
FIG. 3 illustrates a simplified structure of the memory descriptors according to a second embodiment.

FIG. 3 illustrates a simplified structure of the memory descriptors in the particular case of a multithread application when access to the entire address space is given to a thread. This second embodiment of the invention adopts the address space level granularity as described above in the document. In this case, the number of page tables required to provide exclusive access during a scheduling period can be compressed to two. Every thread group would have a pair of page tables associated with it. A pro page table (370) and an anti page table (375). The pro page table (370) is used for address translation and is assigned to the thread (Thread 1 in FIG. 3) which is given access to the address space in that scheduling period. The rest of the threads (Thread 2 and Thread 3) which are denied access in that scheduling period are assigned the anti page table (375). The page table structure as illustrated comprises a unique memory descriptor (300) shared by the thread group. The memory descriptor contains two pointers (310, 320) to two page directories (330, 335) of the respective page tables (370 and 375). Each page table structure comprises a Page Middle Directory (340, 345) each of them indexing a list of entries (350, 355). In FIG. 3, using the process as described in relation with FIG. 6, access is granted (365, 367) to Thread 1 to access two page frames (160, 165); access is denied (362, 364) to the other threads of the group, Thread 2 and Thread 3, to access those two page frames (160, 165).

Figure 4:
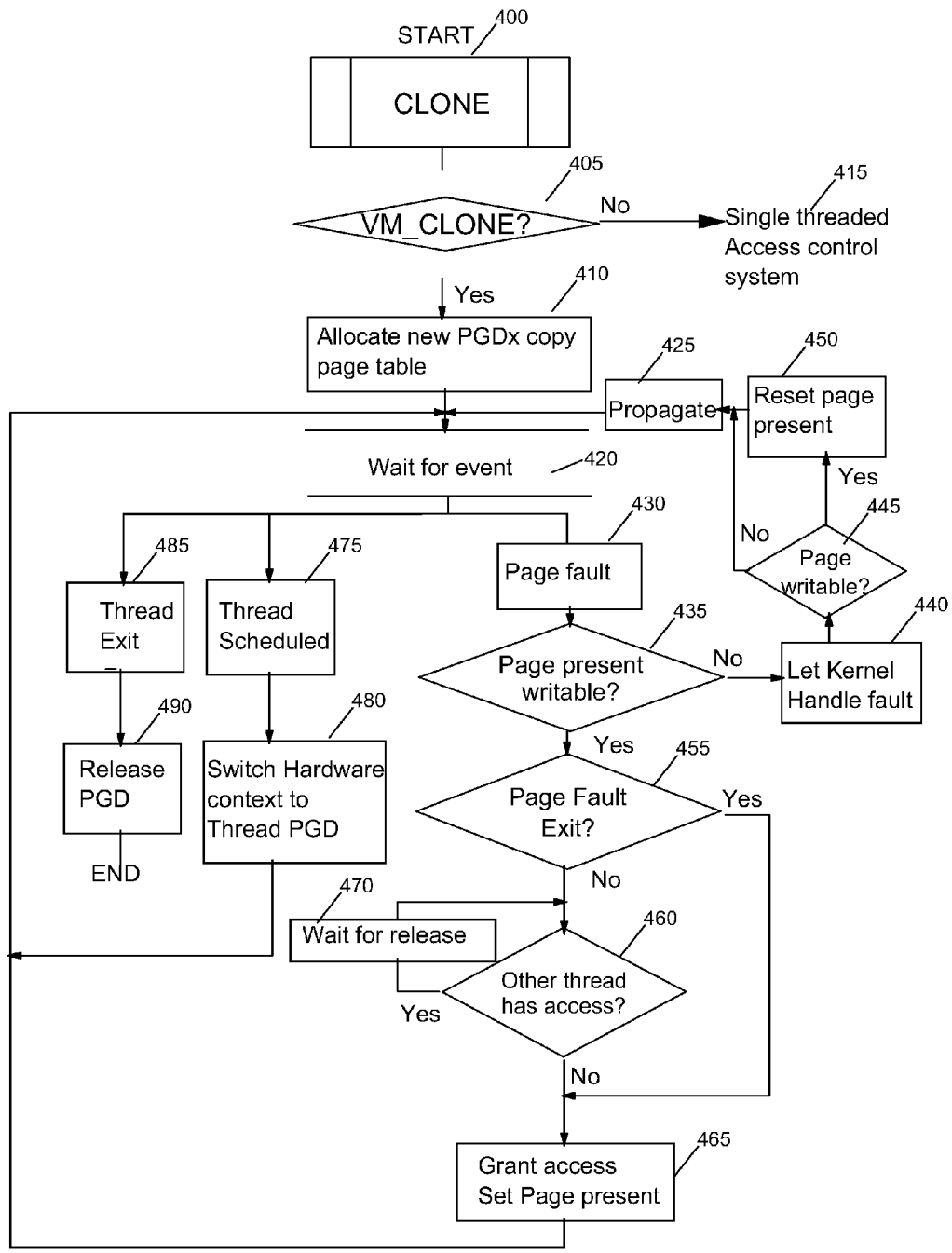
FIG. 4 is the flowchart of the method according to the preferred embodiment.

FIG. 4 is the flowchart of the method for accessing memory from threads of a thread group according to the preferred embodiment.

The private page tables are created as a part of the clone system call. If a virtualized process does not call a clone system call with VM_CLONE flag set, the access control system is for thread is not used and the current method is not executed. When a virtualized process calls clone system call with VM_CLONE flag set, the existing copy_mm function is modified to allocate a new page directory to hold the private page table for the thread which is being created, and add it to the hash table. It then calls a new function, rr_dup_vmas to systematically copy the entire page table hierarchy. This function is modeled after an existing function called dup_vmas which is called by fork to create a new page table for the newly created child process. The key differences between these two functions are as follows: in the case of rr_dup_vmas, all the page table entries are copied with no exception, while dup_vmas skips the pages for which an existing flag called VM_DONT_COPY is set. Further the dup_vmas function marks the writable portions of address space read-only for both parent and child to implement copy-on-write, while, the rr_dup_vmas makes all writable entries absent. The set of page tables used by the threads in a group are kept synchronized in order to preserve the memory sharing semantics of threads. Any modification to any of the page tables is propagated to the rest so that those changes are reflected in the context of other peer threads.

The implementation of shared memory access control for threads needs to address a specific issue which does not occur in the case of processes. The kernel often directly accesses the address space of a process. For instance, when a user level thread or a process passes a memory buffer to the read system call, the file system component of the kernel directly writes to the buffer supplied by the user space program. Such accesses to shared memory are normally arbitrated by the access control mechanism. However, in the case of threads, the kernel directly writes the value of the thread identifier to a user supplied memory pointer in the process address space when a thread is about to exit. Such an access is detected by checking an existing flag in the process descriptor called PF_EXITING, and if the flag is set, the specific access is excluded from the normal access control and the kernel is given unconditional access.

In general, a per-thread page table is freed when the corresponding thread exits, either explicitly by calling the exit system call or implicitly when killed by the kernel. In particular, when one of the threads in the process calls exec system call, it unmaps the current address space of the process and creates and kills all other threads in the process except the thread which has called the exec system call. The thread exit operation of the kernel is modified to release the page directory and the page table hierarchy associated with the exiting thread. At the end of exec system call, only one process remains with a fresh set of page tables. Any subsequent threads created by this process would inherit a copy of its page tables, and the exclusive access control is enforced again.

In the flowchart FIG. 4, we have the corresponding steps illustrated: requesting creation of a new thread with VM_CLONE (405); allocating a new page table directory in the memory descriptor and creating a copy of the page table of the existing thread (410); waiting for an event (420); when a page fault occurs (430), the two bits indicating that the page is present in memory and writable are tested (435); if the page is present and writable (Yes test 435), and if the thread is tested that it is about to exit (Linux PF bit tested 455: Yes), granting (465) to the thread having caused the page fault an access to the page and setting the bit indicating that the page is present in memory and writable, and going to the step waiting for an event (420); if the page is present and writable, if an other thread has access to it and waiting (470) for release of the page by the other thread (460) wait for the other thread to release; when the thread has released access, granting to the thread having caused the page fault an access to the page and setting the bit indicating that the page is present in memory and writable, and going to the step waiting for an event; after the step of testing the two bits indicating that the page is present in memory and writable (435), if the page is not present or not writable, letting the kernel handling the page fault (440); testing (445) if the new page after its creation by the kernel process is writable by testing the corresponding bit, if the new page is writable, resetting (450) the present bit of the new page; propagating (425) the page table entry created by the kernel to the other page tables of all the threads; and going to the step waiting for an event (420).

After the step waiting for an event: when a thread is scheduled (475), switching (480) the hardware context of the memory to the page table of the thread which is going to be scheduled; and going to the step waiting for an event (420).

After the step waiting for an event we have also: when a thread exits (485), releasing (490) the page directory for this thread; and ending the memory access control for this thread.

Figure 5:
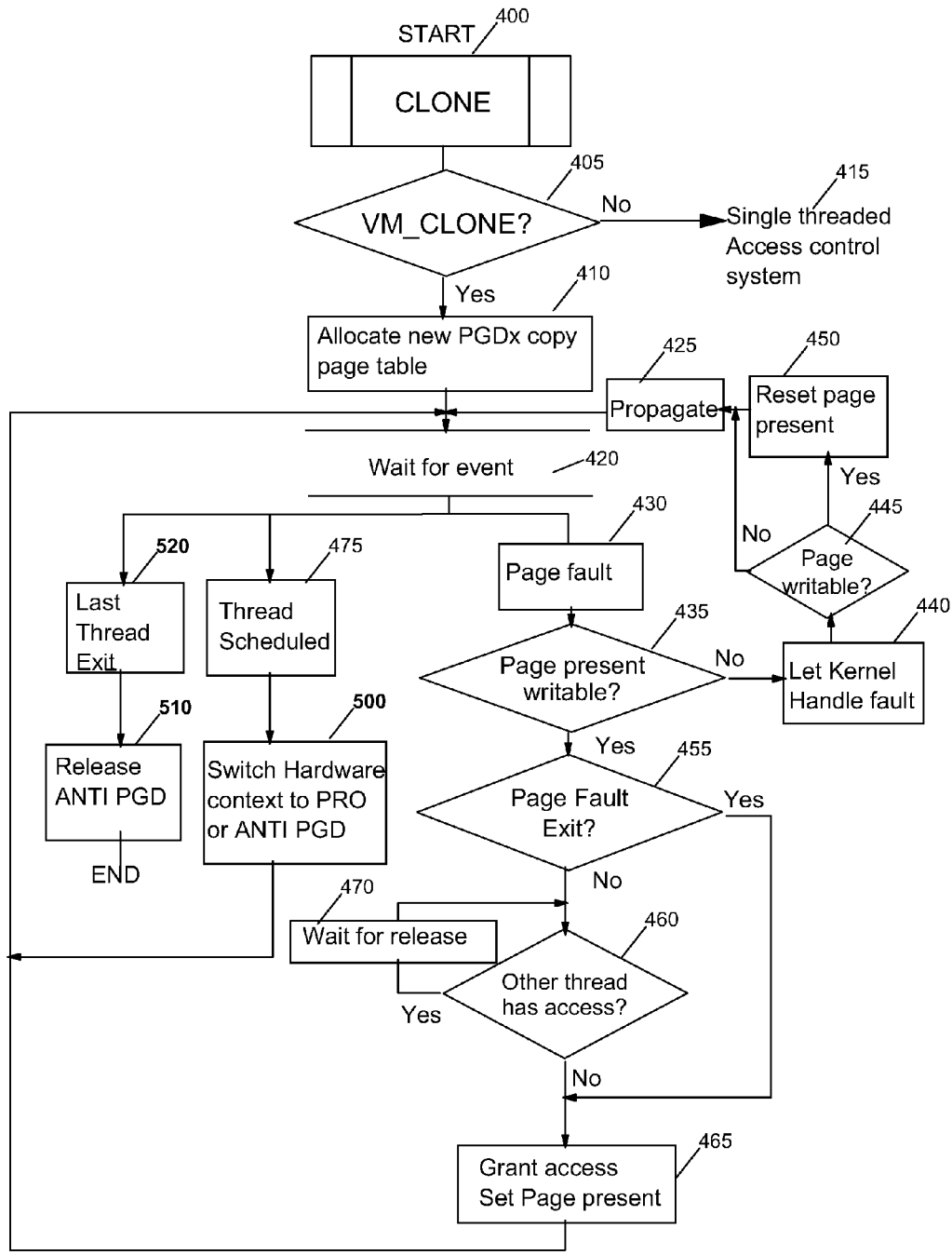
FIG. 5 is the flowchart of the method according to the second embodiment.

FIG. 5 is the flowchart of the method for accessing memory from the threads of a thread group according to the two page table embodiment.

An anti page table is a replica of the pro page table with all the writable portions of address space disabled by resetting the present flag. It is first created by the first thread in the group, when it forks the second thread and the thread count becomes more than one. Both parent thread and the child thread are initially assigned the anti page table. Subsequently created threads are assigned anti page tables at their creation. Before returning from fork, the parent's hardware context is switched to use the anti page table. When the child is scheduled to run for the first time, the context switch routine would assign anti page table.

When any of the threads in the group attempts to access a writable portion of the address space, a page fault interrupt is generated. The page fault interrupt is an interrupt provided by the processor to help the kernel to implement such facilities as demand paging and copy-on-write. The interrupt handler which services this interrupt differentiates a page fault interrupt generated as a part of normal functioning of the kernel from a fault caused due to access control, by examining the present and write flags of the corresponding entry in the pro page table. If the page is present and writable, the fault must have been caused due to access control and the thread is given access to the address space if another thread is already not holding access. If the page is not present or if it was a write access to a read-only page, the page fault is genuine and it would be handled through the regular channel provided by the kernel. If the page is not present in both pro and anti page tables, the page fault is handled as a normal page fault first before arbitrating access to the address space.

At any given time, only one of the threads in the thread group would have access to the address space. The thread identifier (tid) of the thread which holds the access is stored in the memory descriptor, protected by a lock. When a thread attempts to access the shared memory for the first time in the scheduling period and the shared memory is not already held by any other process, its tid is stored in the memory descriptor and the task's hardware context is changed to reflect the new page table and the TLB entries of old page table are invalidated. It is possible that the task is scheduled to run on a processor which is different from the one on which the page fault occurred. But this doesn't cause a problem because the new page table is loaded before returning from the page fault handler.

If the access cannot be immediately granted, other tasks are scheduled to run. The waiting thread will eventually get access when the address space is released by the owner thread. When a task is suspended or when the task calls exit, the access is released by removing its tid stored in the memory descriptor.

In the flowchart FIG. 5, we have the corresponding steps illustrated: with this second embodiment, the step of allocating (410) a new page table directory in the memory descriptor and creating a new page directory which is a copy of the page table of the existing thread is performed only if it is the first thread; and it further comprises: resetting the page present flag of all the pages which have the writable bit set.

The step of switching (480) the hardware context of the memory to the page table of the thread to be scheduled is replaced by (500): switching the hardware context of the memory to the existing page table if the thread has access to the address space (pro PGD); and if the thread does not have access to the address space, switching the hardware context of the memory to the newly created page directory (anti PGD).

The step of releasing (490) the page directory when a thread exits is replaced by (510): when there is only on more thread left in the process, releasing the newly created page directory.

A drawback with the solution of the preferred embodiment may be increasing the complexity of memory management as a page table is instantiated for each thread. The changes in mapping in one thread must be propagated to other threads in the group. With the two page table implementation, the implementation of access control is simpler.

The invention claimed is:

1. A method comprising:
   requesting a creation of a new thread by the process;
   allocating a new page table directory in a memory descriptor and creating a copy of an existing page table of at least one existing thread;
   granting access to a page to a first thread, wherein the access granted to the page by the first thread and any subsequent threads is mutually exclusive;
   modifying a page-present bit associated with an allocation of the page in physical memory in response to the granting access to a page to a first thread such that a page fault interrupt is generated when a second thread attempts to access the page by at least:
      setting the page-present bit associated with an allocation of the page in physical memory for the first thread to a first value in response to the granting access to a page to the first thread; and
      setting the page-present bit associated with an allocation of the page in physical memory for the second thread to a second value in response to the granting access to a page to the first thread;
   determining whether the page is present in memory and is writable when the page fault is generated, wherein whether the page is present in memory and is writable are indicated by two bits; and
   when the page is present in memory and is writable and the first thread is determined to be about to exit, granting to the second thread an access to the page and setting the two bits indicating that the page is present in memory and is writable, wherein the thread exit operation of a kernel is modified to release a page directory and a page table hierarchy associated with the exiting thread.

2. The method of claim 1 further comprising:
   after the step of determining whether a page is present in memory and is writable, if the page is not present or not writable, letting a kernel handle-the page fault;
   determining whether a new page after its creation by the kernel is writable by testing a corresponding bit,
   resetting a present bit of the new page if the new page is writable,
   propagating a page table entry created by the kernel to other page tables of all threads; and
   going to the step waiting for an event.

3. The method of claim 1, further comprising:
   when a thread is scheduled, switching a hardware context of the memory to a page table of the thread which is going to be scheduled.

4. The method of claim 1, further comprising:
   when a thread exits, releasing a page directory for this thread; and
   ending the memory access control for this thread.

5. The method of claim 1, wherein the step of allocating a new page table directory in the memory descriptor and creating a copy of the existing page table of the at least one existing thread is performed only for the first thread, and the method further comprising:
   resetting page present flags of all the pages that have writable bits set.

6. The method of claim 3 wherein the step of switching the hardware context of the memory to the page table of the thread to be scheduled comprises:

switching the hardware context of the memory to the existing page table if the thread has access to the address space; and switching the hardware context of the memory to a newly created page directory if the thread does not have access to the address space.

7. The method of claim 4 wherein the step of releasing the page directory when a thread exits comprises:

when there is only one more thread left in the process, releasing the new-page directory.

8. The method of claim 1, further comprising:

incrementing a usage counter associated with the page in response to the modifying a page-present bit.

9. The method of claim 1, wherein the setting the page-present bit associated with an allocation of the page in physical memory for the first thread to a first value and the setting the page-present bit associated with an allocation of the page in physical memory for the second thread to a second value occur at least partially simultaneously.

10. A system comprising:

at least one computing device; and one or more instructions that, when implemented in the at least one computing device, configure the at least one computing device for:

requesting a creation of a new thread by the process;

allocating a new page table directory in a memory descriptor and creating a copy of an existing page table of at least one existing thread;

granting access to a page to a first thread, wherein the access granted to the page by the first thread and any subsequent threads is mutually exclusive over an entire duration;

modifying a page-present bit associated with an allocation of the page in physical memory in response to the granting access to a page to a first thread such that a page fault interrupt is generated when a second thread attempts to access the page by at least:

setting the page-present bit associated with an allocation of the page in physical memory for the first thread to a first value in response to the granting access to a page to the first thread; and setting the page-present bit associated with an allocation of the page in physical memory for the second thread to a second value in response to the granting access to a page to the first thread;

determining whether the page is present in memory and is writable when the page fault is generated, wherein whether the page is present in memory and is writable are indicated by two bits;

when the page is present in memory and is writable and the first thread is determined to be about to exit, granting to the second thread an access to the page and setting the two bits indicating that the page is present in memory and is writable, wherein the thread exit operation of a kernel is modified to release page directory and a page table hierarchy associated with the exiting thread.

11. A system comprising:

means for requesting a creation of a new thread by the process;

means for allocating a new page table directory in a memory descriptor and creating a copy of an existing page table of at least one existing thread;

means for granting access to a page to a first thread, wherein the access granted to the page by the first thread and any subsequent threads is mutually exclusive over an entire duration;

means for modifying a page-present bit associated with an allocation of the page in physical memory in response to the granting access to a page to a first thread such that a page fault interrupt is generated when a second thread attempts to access the page by at least:

setting the page-present bit associated with an allocation of the page in physical memory for the first thread to a first value in response to the granting access to a page to the first thread; and setting the page-present bit associated with an allocation of the page in physical memory for the second thread to a second value in response to the granting access to a page to the first thread;

means for determining whether the page is present in memory and is writable when the page fault is generated, wherein whether the page is present in memory and is writable are indicated by two bits;

means for, when the page is present in memory and is writable and the first thread is determined to be about to exit, granting to the second thread an access to the page and setting the two bits indicating that the page is present in memory and is writable, wherein the thread exit operation of a kernel is modified to release page directory and a page table hierarchy associated with the exiting thread.

* * * * *